US 6,681,466 B2

(12) United States Patent
David et al.

(10) Patent No.: US 6,681,466 B2
(45) Date of Patent: Jan. 27, 2004

(54) ROUTER REPLACEMENT METHOD (75) Inventors: Bruce R. David, Greenwood, IN (US); William J. Rushin, Greenwood, IN (US)

(73) Assignee: United Air Lines, Inc., Chicago, IL (US)

(*) Notice: Subject to any disclaimer, the term of this patent is extended or adjusted under 35 U.S.C. 154(b) by 0 days.

(21) Appl. No.: 09/851,844

(22) Filed: May 9, 2001

(65) Prior Publication Data

US 2002/0166219 A1 Nov. 14, 2002

(51) Int. Cl.[7] .............. B29C 73/00; B23P 6/00
(52) U.S. Cl. .............. 29/402.01; 29/402.06; 29/402.08; 29/402.09; 29/402.11; 29/402.15
(58) Field of Search .............. 29/402.01, 402.03, 29/402.06, 402.08, 402.09, 402.15, 402.17, 457, 524.1, 402.11, 34 B; 144/134.1; 409/180; 407/54; 408/178, 175, 87

(56) References Cited

U.S. PATENT DOCUMENTS

| | | |
|---|---|---|
| 2,412,972 A | 12/1946 | Dean |
| 2,692,425 A | 10/1954 | Martin |
| 3,010,352 A | 11/1961 | Dunlap |
| 3,133,339 A | 5/1964 | Ribich |
| 3,259,021 A | 7/1966 | Appleton et al. |
| 4,197,887 A | 4/1980 | Groves |
| 4,323,100 A | 4/1982 | Silken |
| 4,399,965 A | 8/1983 | Walker |
| 4,406,568 A | 9/1983 | Rogers et al. |
| 4,499,624 A | 2/1985 | Bloome et al. |
| 4,614,466 A | 9/1986 | Snyder |
| 4,619,170 A | 10/1986 | Maier et al. |
| 4,850,763 A * | 7/1989 | Jack et al. .............. 408/88 |
| 4,869,443 A | 9/1989 | Skow |
| 4,947,910 A | 8/1990 | Reneau |
| 5,052,454 A | 10/1991 | Meinhardt |
| 5,176,476 A | 1/1993 | Duffy et al. |
| 5,275,360 A | 1/1994 | Porter et al. |
| 5,289,861 A * | 3/1994 | Hedrick .............. 144/134 |
| 5,515,611 A * | 5/1996 | Maldonado .............. 144/371 |
| 5,517,746 A | 5/1996 | Cox et al. |
| 5,562,136 A | 10/1996 | Blackshear |
| 5,685,675 A | 11/1997 | Beekman |
| 5,746,553 A | 5/1998 | Engwall |
| 5,806,577 A | 9/1998 | Durand |
| 6,027,289 A * | 2/2000 | Posh .............. 409/175 |
| 6,176,281 B1 | 1/2001 | Newman |

FOREIGN PATENT DOCUMENTS

| | | |
|---|---|---|
| EP | 0 763 395 A2 | 3/1997 |
| FR | 875340 | 9/1942 |
| WO | WO 97/29953 | 8/1997 |

OTHER PUBLICATIONS

International Search Report for international patent application, PCT/US02/13111, dated Aug. 20, 2002.
International Search Report, dated Jul. 10, 2002, for corresponding application PCT/US02/13110.
Product Catalog, Sioux Tools, Inc., Aug. 2000.

* cited by examiner

Primary Examiner—John C. Hong
(74) Attorney, Agent, or Firm—Brinks Hofer Gilson & Lione

(57) ABSTRACT

A method for easily removing portions of aircraft skin damaged by pressure cycles and corrosion. The method includes inspecting both upper and lower portions of the skin. Using a special router and guide, the damaged skin is then removed and replaced. The method is particularly useful in that it is rapid and precise, and promises control over the process sufficient to insure that aircraft structure below the skins is not damaged. The method may also be used to remove and replace sheet metal used in other applications.

11 Claims, 8 Drawing Sheets

ROUTER REPLACEMENT METHOD

BACKGROUND OF THE INVENTION

Aircraft are very expensive capital goods, whether used in military, commercial, or private sectors. It is not unusual for serviceable aircraft to be flying and earning revenue or performing their mission for 30 or 40 years after manufacture. Examples may be KC-135 tanker aircraft, Boeing 707 and 727 commercial aircraft, and Douglas DC-3 and DC-8 aircraft. Such refurbished aircraft may be re-engined, they may receive completely new avionics, and they may be older than their pilots when returned to service. The important point is that an aircraft and its fuselage may have no inherent life limitation, so long as the owners take steps to maintain the aircraft, prevent corrosion, and insure its serviceability and safety.

One limitation on an aircraft is that its structure undergoes stress and strain every time it takes off and lands. An aircraft also experiences a pressure cycle every time it flies to a relatively high altitude and then returns to earth. The atmospheric pressure at sea level is about 14.7 psia, about 11 psia at 8000 ft, and about 3.5 psia at 35,000 ft. In a passenger aircraft having a pressurized cabin, the fuselage maintains a pressure equivalent to 8000 ft at all altitudes above 8000 ft., or about 11 psia. Thus, the fuselage maintains a delta pressure of about 7.5 psid when it flies at 35,000 ft., about 7.5 lbs of force (higher pressure) inside the cabin pushing against each square inch of the aircraft skin and its fasteners. An aircraft that travels several legs each day goes through one pressure cycle on each leg, as its external atmosphere goes from normal to partial vacuum during its highest point in flight, and back to normal. These cycles lead to cumulative wear and tear on the aircraft, and in particular, may result in stress cracking of skins by the time 50,000 cycles are experienced.

An important element in preserving aircraft and in lengthening their service life is the repair of these skins. Aircraft are periodically inspected to determine the quantity, location, and size of cracks in their skins. These inspections may be visual and they may also make use of non-destructive testing (NDT) means, such as ultrasonic or eddy current inspections. When an inspector determines that an aircraft skin has too many cracks, or when a schedule determines that it is time, the aircraft skin itself may be repaired or replaced. Repair mechanics typically use a grinder or other portable hand tool to cut away portions of skin, similar to auto body shop techniques. The use of a grinder is very time consuming and could have the potential to damage aircraft structural members supporting the skin from below. There is need for a tool and a method that quickly and reliably removes aircraft skin portions without damaging other structural members.

BRIEF SUMMARY OF THE INVENTION

One aspect of the present invention is a special router apparatus for removing aircraft skin laps, and a method for using the apparatus to remove and replace aircraft skin laps. The apparatus includes a guide, fastened to the skin of the aircraft, to guide the router in its path. A platform or trolley sits atop the guide, fitting snugly and interfacing with roller bearings for ease of movement along the guide. A router then mounts atop the platform, the router having a vertical adjustment so as to adjust the depth-of-cut of the skin without penetrating too far and damaging structural elements below the skin. As the router moves along the guide, it makes a linear cut and removes a desired portion of skin from the aircraft. These portions of the skin are those which are overlapped, and in which both the overlap and underlap portions are to be removed. As the router moves along the guide or track, it generates debris as it cuts the metal, typically aluminum, and typically in the form of small chips. A vacuum hose mounts to the platform to collect chips and debris as the router tool generates them.

Another aspect of the invention is a method for using the router apparatus in a skin lap replacement method for an aircraft skin. The method is put into use when an inspection or schedule determines that replacement is needed. In one embodiment, the method includes installing a skin lap router apparatus on the aircraft. A first skin portion, the overlap, is removed along with a second skin portion, the underlap, using the router apparatus. The removed portions are then replaced and fastened into place. The installed skin portions are then inspected. The apparatus and method may also be used for removing portions of sheet metal from other structures

DETAILED DESCRIPTION OF THE INVENTION

Figure 1:
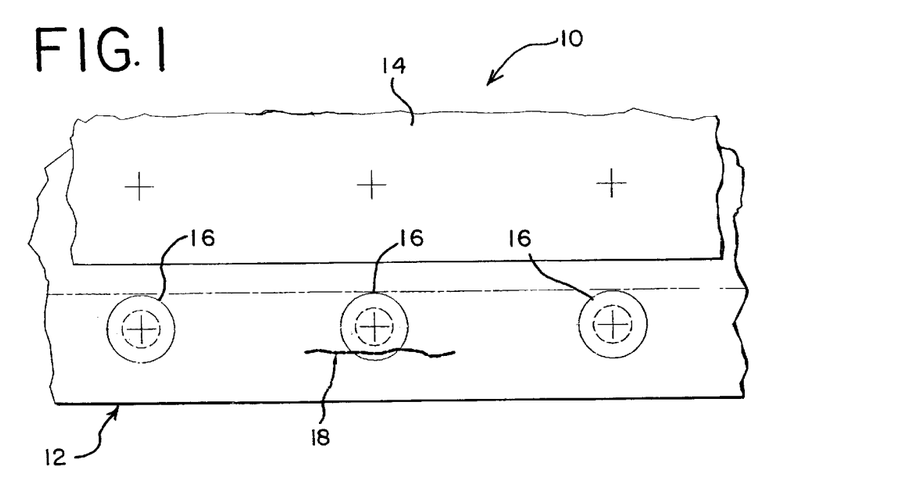
FIG. 1 is a depiction of overlapped aircraft skins, with a crack in the lower skin.
Figure 2:
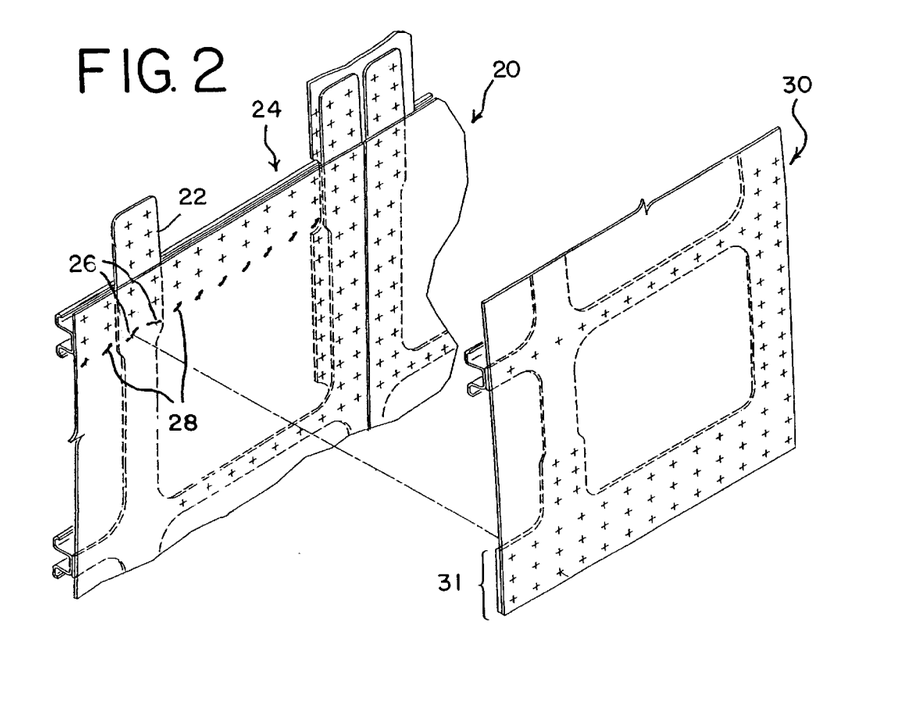
FIG. 2 is an exploded view of the appearance of the skins.

FIG. 1 depicts the problem of cracks or corrosion in aircraft skins. An aircraft skin 10 has a crack 18 hidden under a doubler 12 and a tripler 14, the doubler being a reinforcing layer of skin over the first, basic skin, and a tripler being a second reinforcing layer. The cracks may be near fasteners 16, which act as stress concentrators in aircraft skins that repeatedly undergo pressure cycles. FIG. 2 separates the skins in another example, showing a multitude of small cracks and corrosion in the hidden, lower skin 20, some of which are primary cracks 26 (associated directly with a fastener and the tear strap) and some of which are secondary cracks 28, away from the tear strap. Also depicted are the lower tear strap 22 and the underlying structure 24, primarily stringers, to which the skin of the aircraft is fastened with fasteners, such as rivets, whose presence is depicted by the series of small cross marks in the figure. FIG. 2 also depicts the upper skin 30 and the portion of overlap 31 in one instance, namely, about 3 fasteners wide.

Figures 3, 4:
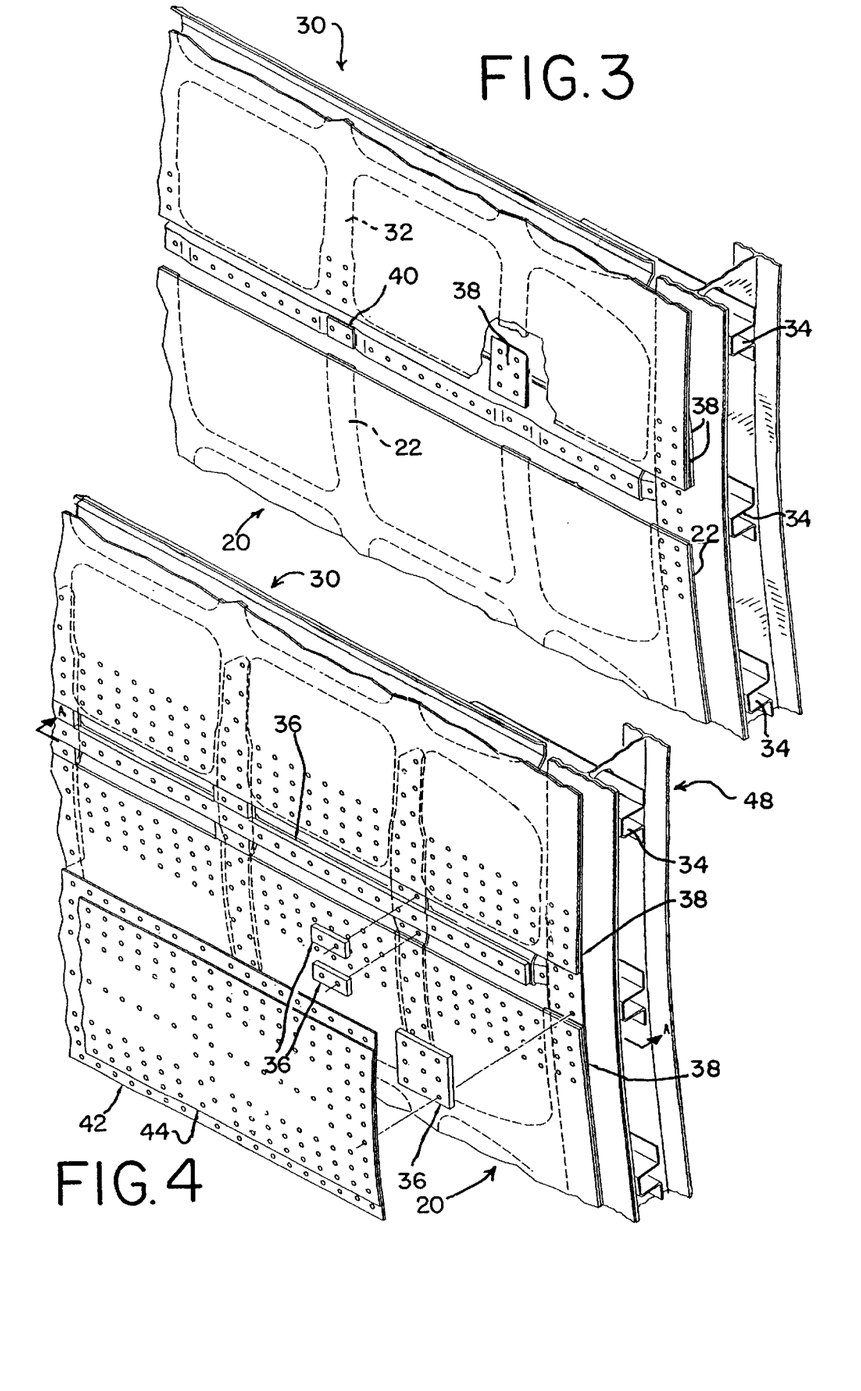
FIG. 3 is an isometric view of the aircraft skin after certain portions are removed according to the present invention.
FIG. 4 is an isometric view of the replacement skins for the aircraft.

FIG. 3 depicts the aircraft with portions of the skin removed, and ready for skin replacement. Lower skin 20 has been cut back to reveal stringers 34, as has upper skin 30. Also visible are lower tear strap 22 and upper tear strap 32. In order for the outermost layers of the skin to lay flat against their support structure, other elements are also needed, well known to those skilled in the art, such as tapered fillers 38 and shims 40. With these elements in place, as well as fillers 36, depicted in FIG. 4, the skin may be replaced. A doubler 42 and a tripler 44 are cut to overlap lower skin 20 and upper skin 30 for several rows of fasteners. In one way of practicing the invention, the overlapping aircraft skin is replaced longitudinally as depicted in these first four figures, from butt joint to butt joint 48, one section at a time.

Figure 5:
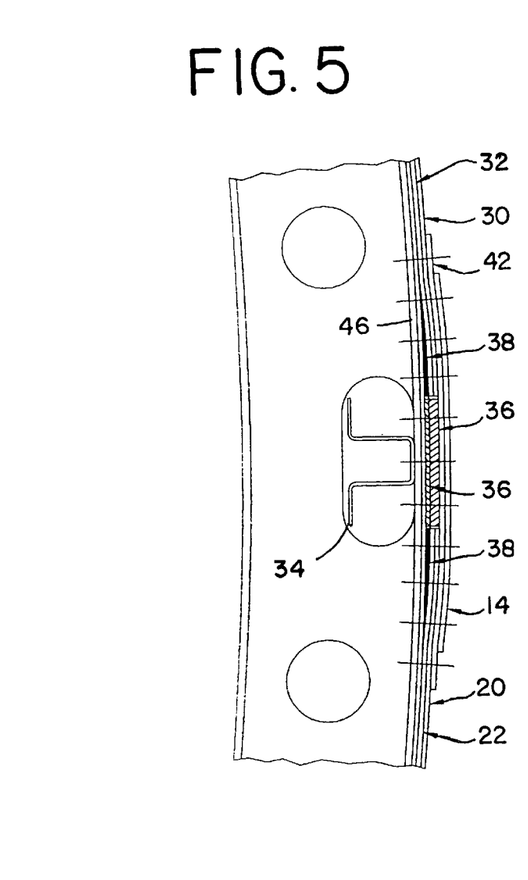
FIG. 5 is a cross-sectional view of the replaced skin of the aircraft.

FIG. 5 depicts a cross-section of a repaired joint. Stringers 34 underlie splice straps 46, lower tear straps 22 and upper tear straps 32. Lower skin 20 and upper skin 30 underlie the doubler 42 and tripler 44 as outlined in the previous figures. This figure also depicts the necessity for fillers 36 and tapered fillers 38, so that the skin conforms to the shape of the aircraft. The original condition of the aircraft included skins that were longer and overlapped, while this method uses a doubler and tripler atop the skin. Therefore, it is also necessary to include filler 36 for the gap that is cut out between the upper and lower skin. All members are held in place by fasteners, typically rivets. While not specifically mentioned, all metal parts, including the sheet metal used for the skins, are treated for the proper degree of strength and toughness, typically 2024-T3 aluminum, and receive surface treatment to resist corrosion. Fastener holes are desirably a minimum of two diameters from any edge of the metal in which they are drilled. Other good manufacturing practices, well known to those skilled in metalworking and aircraft arts, are also observed, including treatments to prevent corrosion, fretting, and the formation of galvanic cells.

Figure 6:
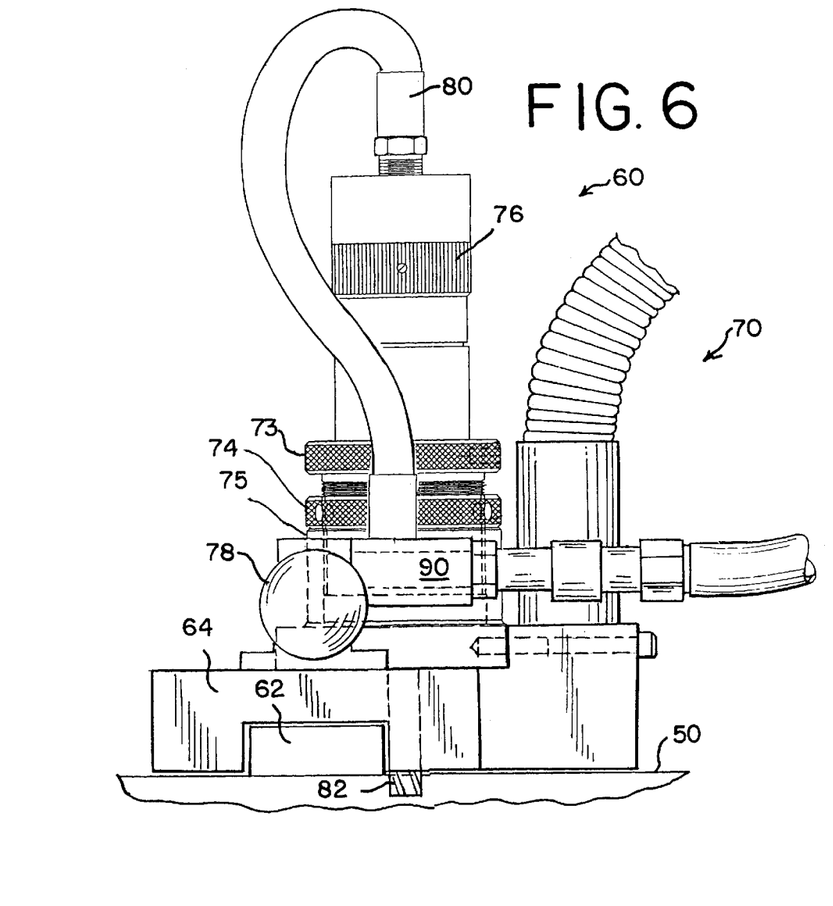
FIG. 6 is a side view of an apparatus for removing aircraft skin laps.

FIG. 6 depicts an embodiment of a skin lap router apparatus, mounted on an aircraft skin 50, useful in the present invention. Router apparatus 70 includes a guide 62, mounted to the aircraft skin with a fastener 58 (visible in FIG. 8). The guide may be a carefully manufactured piece of nylon or plastic with a controlled height or thickness, and may have a profiled cross-section. Mounted movably atop guide 62 is a platform or trolley 64, suitable for mounting a router 60. Router 60 has gripping handles 78, speed adjustment 76, typically for adjusting the flow of air from pneumatic connection 80 to an air motor internal to the router (air motor not shown). The flow adjustment adjusts the speed of the router, rpm, depending on the drilling/milling tool 82 used, the material to be cut and its thickness, and the speed with which the operator propels the router along the guide. An electric router may alternately use an electrical method to control router tool speed, such as a DC motor or a controlled AC motor.

The router also has a mechanism for adjust the height of the cutting tool, namely a vertical adjustment screw 73 and a height adjustment nut 75. In one embodiment, the height adjusting screw is about 2.5 inches o.d. and is tapped externally for 16 threads per inch. The screw mates with a height adjustment nut 75, having 2.5 inches i.d. and tapped internally to mate with the screw. Locking nut or jam nut 74 enables the operator to maintain the desired setting. The external surfaces of the adjustment screw and jam nut may be knurled for easier tightening and loosening. Using a large outer diameter of several inches for these components helps to insure that hand-tightening alone by an operator is sufficient to prevent loosening during a cut. A height indicator may also be added for easy referral by the operator. Using the vertical settings, and with a known thickness of a guide for the platform, the operator has complete and precise control over the depth of cut to make into the aircraft skin. In this manner, the router makes no accidental cuts into the stringers, tear straps, or other structural members of the aircraft.

Figure 7:
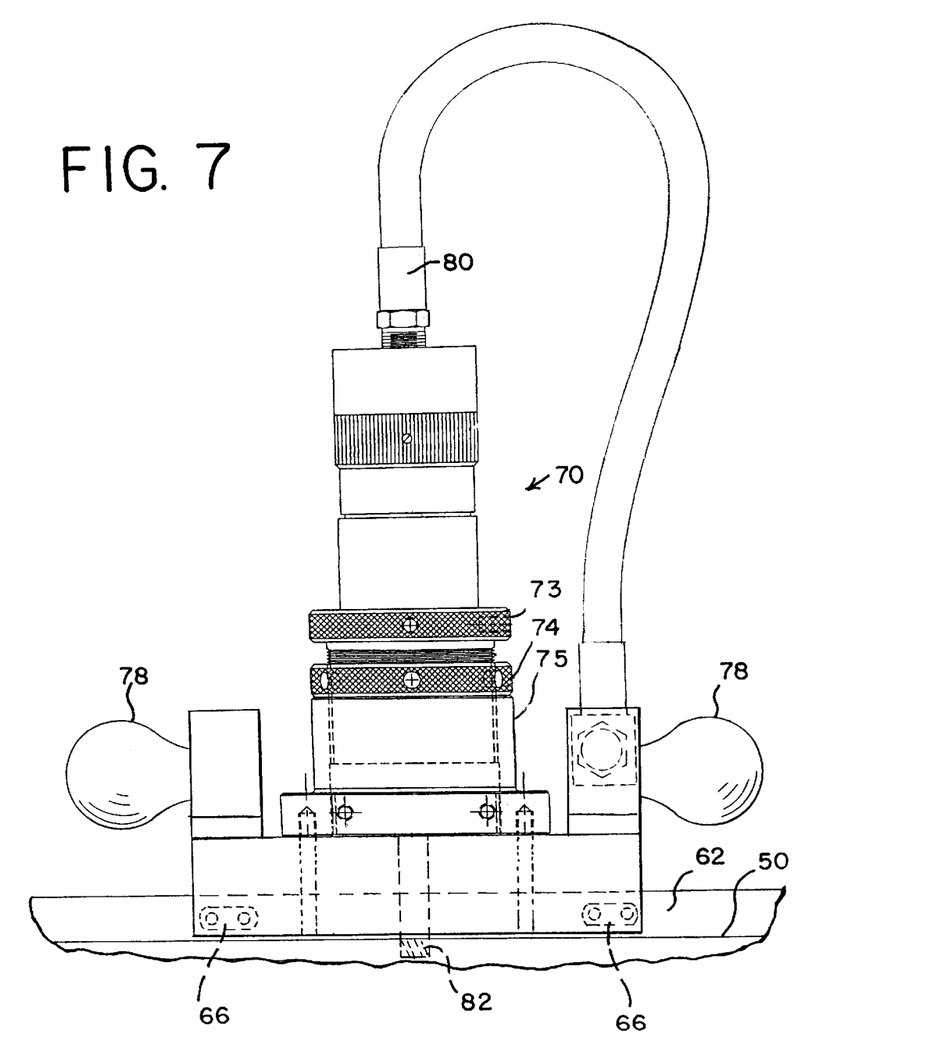
FIG. 7 is an alternate view of the apparatus.

In one embodiment, the router travels along the guide as propelled by the operator. In other embodiments, the router trolley may be outfitted with a device to drive the trolley along the length of the aircraft, such as a small motor (not shown), or even a guide or a way, such as a way from a machine tool. As shown in FIG. 7, the router itself does not travel, but rather the platform 64 to which the router is attached. The platform may also be equipped with bearings 66 for easier movement of the platform along the guide 62.

Figure 8:
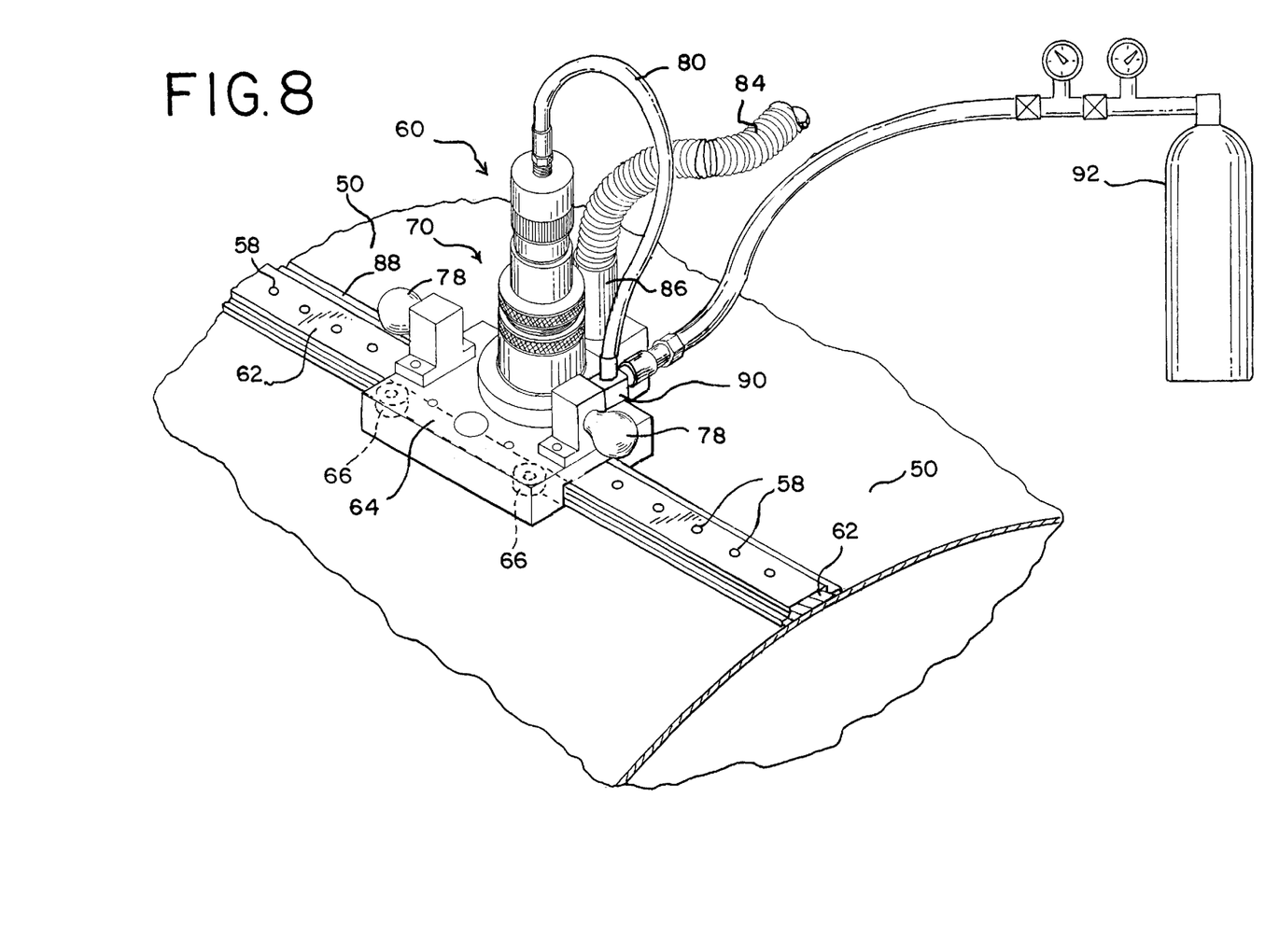
FIG. 8 is another view of the apparatus.

FIG. 8 shows another embodiment, in which the router apparatus 70 and router 60 are equipped with a vacuum attachment 84 via a fitting 86 on the platform 64, for instantaneous removal of chips and debris generated during the removal of the skin portions, forming a gap 88 between the aircraft skin and the overlap to be removed. The platform may also be equipped with a terminal block 90 for connection to a regulated supply of air 92, and for connection to a pneumatic router air hose 80. The connections may be quick-disconnects or permanent fittings as desired. The supply of air may be any suitable supply, such as shop air or bottled gas.

Visible also in FIG. 8 are the fasteners 58 firmly mounting the track 62 to aircraft skin 50. Bearings 66 contained within the platform 64 help for easy maneuvering of the platform along the track during cutting operations. Also shown in FIG. 8 are bearings, such as pre-packed anti-friction bearings, for interfacing with guide 62. Guide 62 may be profiled, as shown, for easier movement of the router platform along the guide, and the internal portion of the platform, with four bearings, to match. In this embodiment, the track is profiled and the router actually rests atop the track, the platform 64 suspended just above the skin of the aircraft to prevent any damage from contact with the aircraft skin. In operation, the operator positions himself or herself on the near side of the router apparatus, grasps the handles 78, and gently and firmly cuts the overlap from the skin of the aircraft.

When a cut is complete, the operator makes another cut in a return path on the opposite side of the guide, in order to remove the desired 3 or 4 inches of skin overlap. In one embodiment, the platform and router may be removed from the guide, turned 180 degrees, and the return cut made. In another embodiment, the router 70 may be removed from the platform 64, along with vacuum fitting 86 and with debris hose 84, and re-positioned on the platform. In this embodiment, the platform itself need not be removed from the guide in order for the re-configured router apparatus to make the return cut on the other side of the guide. This reconfiguring is easier if the platform has an extra through-orifice 94, for the cutting tool to access the aircraft skin.

Cutting the skin overlap breaks the skin of the aircraft, and any debris generated could fall into the interior of the aircraft. The interior may contain electrical lines, control linkages, hydraulic lines, and other important conduits. Debris that is allowed to fall and accumulate could have not only undesirable physical properties, but also could conceivably lead to adverse chemical reactions and corrosion. The debris must be collected and removed. Aircraft skins are typically aluminum, 2024 sheet in a T3 heat treat condition. As one example, in some aircraft, skins made from 2024-T3 are 0.071 inches thick, and are overlapped by about 3½ inches, an upper skin over a lower skin. It is this condition that may be subject to stress cracking over many years and very many pressure cycles. One solution to rid the aircraft of cracked skin, and restore the skin to a better condition, is to cut out the overlap and replace the overlap with a greater overlap in order to better spread the load from skin portion to skin portion. As depicted in the above figures, an overlap may be replaced not merely with a greater overlap and a doubler, but even a tripler, to help contain the stress generated during pressure cycles, that is, flying cycles of the aircraft.

In one embodiment, a doubler under such conditions may be 0.032 inches thick, and a tripler may be 0.050 inches thick, and the arrangement may be such that the overlap is at least as great as the 3½ inches used by the original equipment manufacturer. It will be recognized that neither the material, nor its thickness, nor its overlap is unique for the practice of the invention, but rather the invention is meant to include a wide variety of skins, in varying thicknesses, and with overlaps that may be greater or lesser than 3½ inches. What is also important is that no gaps greater than a few thousandths of an inch exist among and between the several layers of skins and fillers, so as to best provide support for the skin. This will better enable the skin to withstand pressure cycles.

The guide is important to the functioning of the apparatus and method. The guide is desirably made of several 6 ft pieces of plastic, to match the 20-feet length between butt joints in aircraft skin. The guide has uniform width and height, for securing to the sheet metal-skin of the aircraft. A uniform width of the guide is important for maintaining a uniform, straight cut over the length of the aircraft skin. The height is important for maintaining a uniform depth-of-cut, removing the skin but not damaging the underlying structure of the aircraft. Such control over the width and height may be achieved by machining or extruding plastic for a guide, or by other manufacturing methods. The guide may be profiled or plain. It has been found that nylon is particularly suitable for this application, although other plastics, such as thermoplastic or thermoset materials, may also be used. The guide may be fastened to the aircraft with fasteners, 5/32" or 3/16", preferably about 1 fastener per running foot, but more or fewer fasteners may be used.

The platform or trolley mounts onto the guide, and in turn supports a router and a vacuum hose. The platform is desirably made of aluminum for ease of manufacture, but may just as well be another material able to rigidly support the router and maintain dimensional stability. It is desirable to include roller bearings in the platform in such a manner that the bearings interface with the guide and provide smooth, not jerky movement, along the guide. The edge left on the aircraft skin should be smooth and not have any jagged edges or crack-initiation sites. This is best accomplished with a smooth, controlled cut by a high-speed router according to the present invention. The trolley is desirably designed for connection to a vacuum hose, in such a manner that the vacuum suction is a very short distance from the cutting tool. The vacuum will desirably gather and remove all the dust, debris and particles generated during the metal-removal process. This will also prevent the debris from falling into the aircraft.

The router may be a commercially available router, such as those from Sears Roebuck and sold under the "Craftsman®" trademark, or it may be an air-powered router from Sioux Tools, Inc., Sioux City, Iowa. One particular router than has been useful in practicing the invention is a model 1980 pneumatic, high-speed router, having a ⅜" collet and capable of 1½ hp output. The depth-of-cut may be used as provided on a commercially available router, or it may be supplemented with a more precise vertical adjustment. In one embodiment of the invention, the standard vertical adjustment is replaced with a more precise adjustment, as depicted in FIGS. 6 and 7, and described above. In one embodiment of the invention, the vertical adjustment may be as precise as ±0.001 inches or even finer. By maintaining control over the vertical adjustment, an operator maintains control over the depth-of-cut, and avoids damaging the aircraft structure underlying the skin of the aircraft.

Figure 9A:
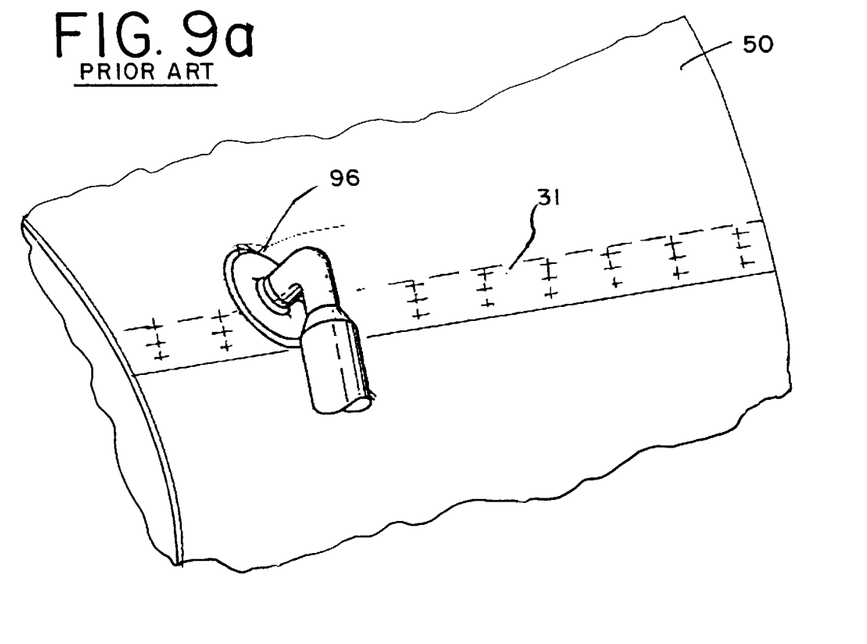
FIGS. 9a and 9b depict prior art processes for skin lap removal.
Figure 9B:
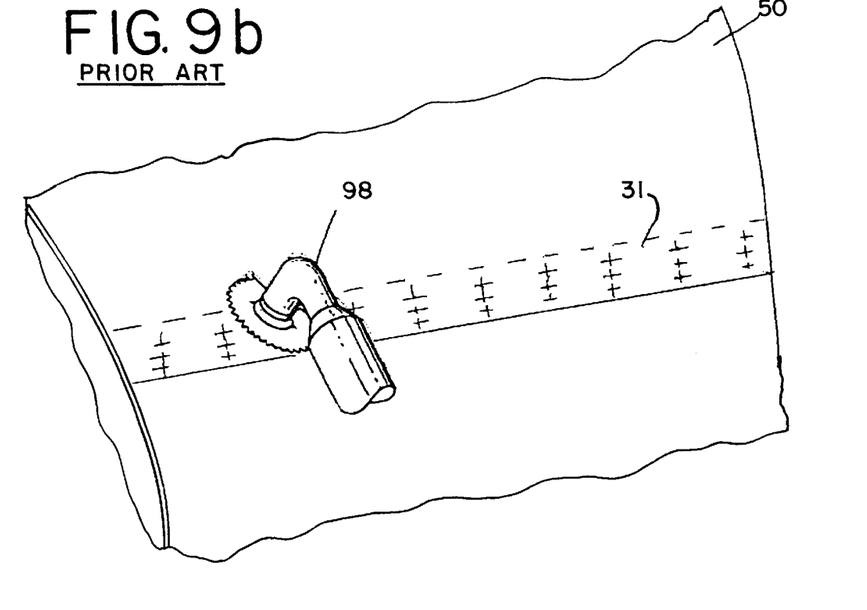

In one embodiment, the router cuts easily through 2024-T3 aluminum skins with a 3-fluted, 0.250" carbide end mill, preferably operated at high speeds, 18,000–20,000 rpm. It has been found that this technique results in the least generation and transfer of heat to the aircraft structure. Using about a 0.150" depth-of-cut, both the upper and lower overlap skins may be removed in a single pass on each side of the overlap to be removed. Proper feed rates insure that the aluminum will not gum up during machining, and will also provide small chips to be vacuumed up, rather than tearing the aluminum or providing long strips of cut metal. The combination of feeds and speeds for milling aluminum are well known to those skilled in metal-removal arts, and this knowledge is applicable in this situation. It has also been found that with this particular combination of cutting tool and speed, little burring is incurred during the cutting operation. Therefore, what deburring is left may be accomplished with hand tools and emery cloth used sparingly. The combination of rapid cutting and little deburring helps to make the metal-removal operation more economical than it otherwise would be. In one test, 8000 estimated man-hours per 737-200 aircraft for the removal and replacement of skin overlaps was accomplished in less than 4000 man-hours, with no damage to the aircraft structure. The present recommended method is depicted in FIGS. 9a and 9b. In FIG. 9a, an operator uses a portable, hand grinder 96 to grind away a skin lap joint 31, typically 3 fastener rows deep, thus freeing skin portions from aircraft skin 50. In FIG. 9b, an operator uses a portable hand cutting tool 98 to cut away a skin lap joint 31 from the aircraft skin 50. These methods do not entertain the same degree of control over the cut as the present invention.

In one embodiment, the method of practicing the invention is straightforward. Skin of an aircraft is inspected to determine whether there are cracks. The skin of an aircraft may have overlapping joints, typically in a vertical direction, with one skin overlapping another. The skin of an aircraft typically has overlap in a vertical direction and butt joints in a horizontal direction, with all skin supported by aircraft structure, such as tear straps, splice straps and stringers. In repairing skin laps, personnel typically repair and replace one lap at a time, from butt joint to the next butt joint in a horizontal direction.

Cracks that develop in the upper skin may be easily determined by visual means, while cracks in the lower skin are hidden by the upper skin and cannot be detected visually. Therefore, NDT techniques have been developed to detect small cracks that are not visible. The eddy current technique is perhaps most frequently used, the technique depending on discontinuities in the conductive path of the skin. Inspectors may use either visual or eddy current techniques to determine whether cracks are present. Aircraft operating personnel also use information from the aircraft manufacturer, typically based on aircraft age and pressure cycles, for skin inspection and replacement schedules. In many cases, operating personnel will also remove aircraft interior portions, insulation, and coverings, in order to observe and inspect the skin of the aircraft from inside the aircraft.

In one method, the loads of an aircraft skin are removed so as to avoid strain or distortion of the remainder of the skin when a portion of the skin is cut out via the skin lap replacement method. This may include blocking or removing aircraft engines, as one example. Other precautions may also be taken, such as protecting any critical areas or components of the aircraft from the metal chips and debris that the replacement process generates.

With the aircraft prepared, and the view of the skin as unobstructed as possible, airline personnel inspect the skin of the aircraft, typically visually and by NDT techniques, making a thorough record and report of their findings. They prepare a schedule for repairing/replacing the lap joints. In one method according to the present invention, personnel then remove fasteners for one lap joint, said fasteners being those that are common to a stringer, a frame of the skin, and the butt joints common to the lap joint in question. This is typically three rows of fasteners. The holes thus freed may be used, if convenient, to secure the plastic guide for the router trolley/platform to the aircraft skin. In one method of practicing the invention, 3/16" or 5/32" fasteners are used, one per lineal foot, to secure the guide to the skin, using about 35 in-lbs of torque, and insuring that the guide is installed flush, without interfering chips or debris.

With the guide installed, the operator then installs the router apparatus including the platform or trolley onto the guide. The objective is to make a lengthwise cut in the aircraft skin, typically from butt joint to butt joint, but lesser cuts are also possible if desired. The router apparatus then makes the cut, using the vertical adjustment to insure that the skin is completely cut, but with a depth-of-cut not so deep that it damages the underlying aircraft structure, such as stringers, tear straps, splice straps, etc. While the operator is cutting the skin, he uses the pneumatic input and throttle control to control the speed of the router bit or cutting tool, and the vacuum line vacuums up the debris generated by the process. The flow of air may also help to keep cool the tool and the area of skin in contact with the tool.

Once the lap is cut on one side, a cut is made on the opposite side of the lap. The overlap joint is then removed. Of course, the remaining structure and skin are thoroughly cleaned to remove all dust, chips and debris. It may also be desirable to treat any newly exposed surfaces with corrosion inhibitor or sealant or other chemical useful for retarding corrosion, inhibiting the formation of galvanic cells, or protecting the aircraft structure in a desired manner. Fillers for the removed skin are readied. In a preferred method, a doubler and even a tripler skin portion may then be laid atop the filler and all are bonded to the structure with fasteners. In a preferred method, filler is used to fill all gaps greater than 0.01" in dimension, and of course, fillers are bonded to the structure with these same fasteners. Typically, all fillers, doublers, triplers, etc., are treated with chemicals or sealants to retard corrosion and to protect the aircraft structure. Good manufacturing practice dictates that fasteners, or fastener holes, should not be closer than 2.0 diameters of the hole to any edge of skin or filler, in order to prevent stress concentrators.

Figure 10:
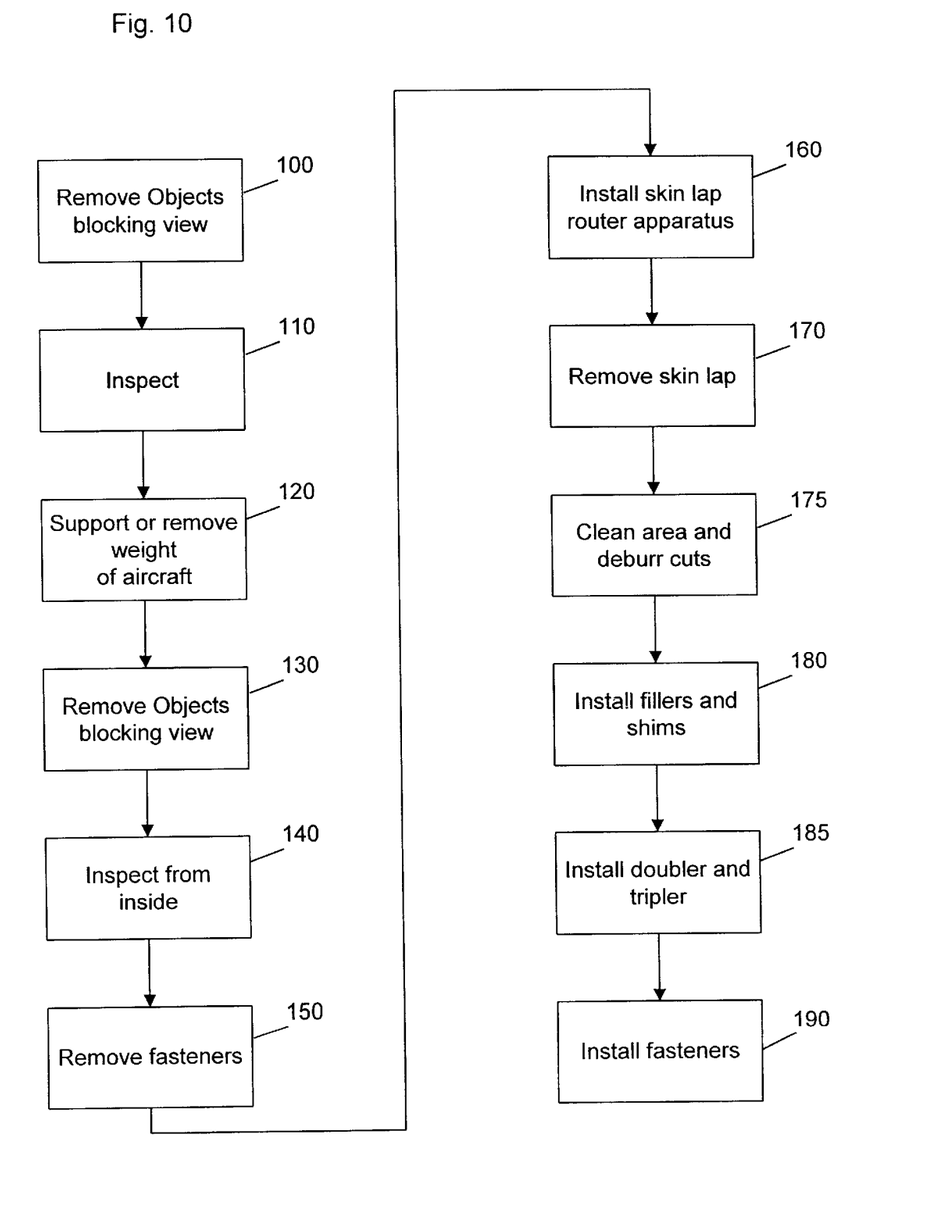
FIG. 10 is a flow chart depicting a method of practicing the present invention.
Figure 11:
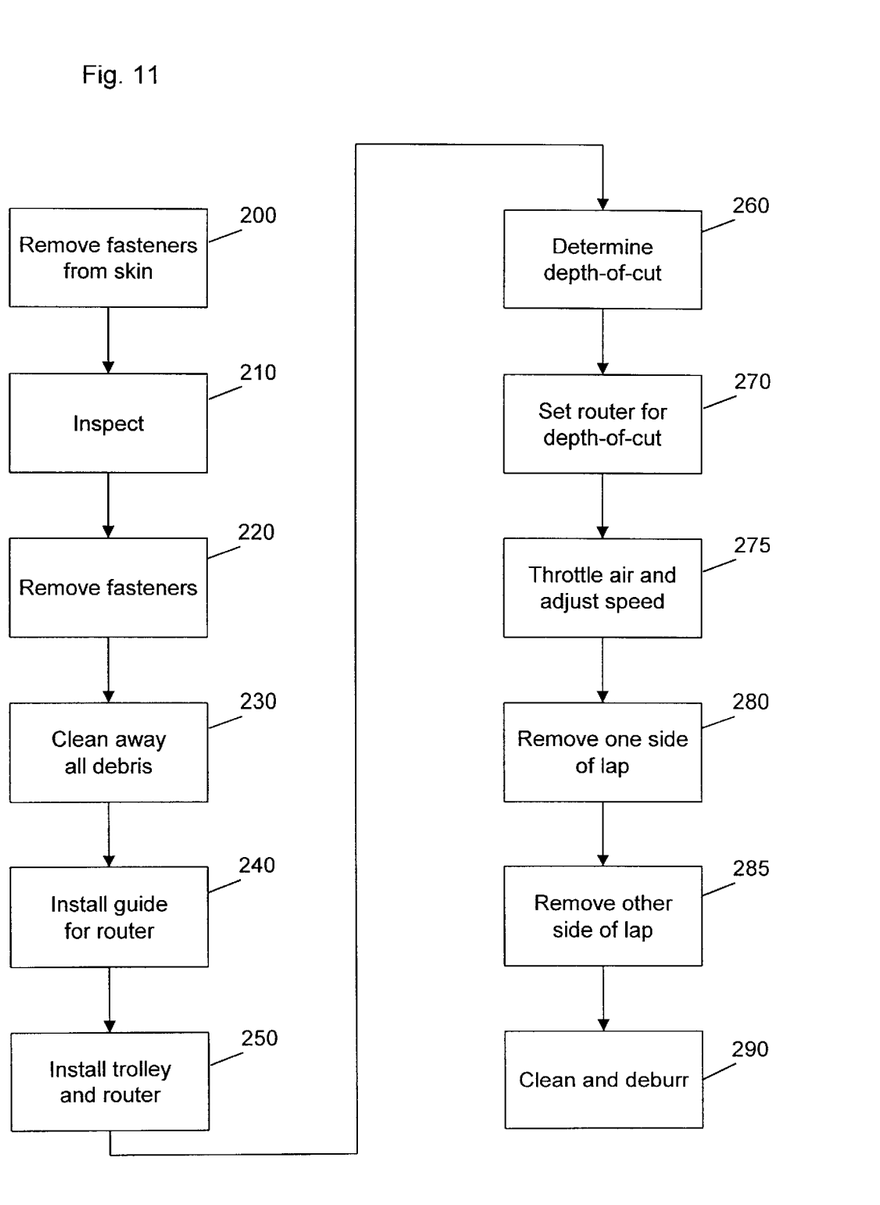
FIG. 11 is a flow chart showing a detailed outline of the method.

FIG. 10 depicts an enlarged view of one method of practicing the present invention, while FIG. 11 presents a closer view of the operator's actions in using a skin lap router apparatus to remove the lap. In one way of practicing the invention, an inspector will inspect the aircraft for signs of cracks from pressure cycles. A first step from the outside of the aircraft may be to remove any obstacles 100 obstructing the view of the inspector, perhaps paint or decals that would hinder a thorough inspection either visually or by NDT methods, such as ultrasonic or eddy current techniques. The inspector then inspects 110 the outside of the aircraft to the extent possible to determine cracking and signs of corrosion. At some point, not necessarily this early in the process, the load must be removed from the skin before it is cut. This may mean removing or blocking the engines to a height so that they do not load the skin of the aircraft 120.

Having finished with the outside of the aircraft at this point, the operator turns his attention to the inside. He inspects the skin on the inside of the aircraft. To accomplish this, it may be necessary to remove interior furnishings, panels, insulation batts, etc., removing objects 130 blocking the inspector's view of the inside of the skin. The inspector may then inspect the skin of the aircraft from the inside 140, looking especially for cracks and signs of corrosion in the metal, and inspecting both visually and by NDT techniques. If the decision is made that skin lap replacement is warranted, then skin lap replacement in accordance with the invention proceeds. Sheets of plastic or other material may be installed inside the aircraft, under the skin, to help catch particles and debris generated during subsequent operations.

The operator then removes fasteners 150, typically three rows of rivets in many aircraft skin overlap joints. The rivets are drilled out, taking care to minimize and collect debris generated during the removal process. The operator then installs the skin lap router apparatus 160, first making sure that the area has been cleaned of debris, chips, and any swarf generated during the fastener removal. As mentioned above, the step of installing the apparatus may include fastening the guide to the aircraft skin, and then installing the router platform or trolley onto the guide. The skin lap is then removed 170 by making a cut on either side of the skin lap. Even taking care and using a vacuum collector, it is possible that the cutting process will throw off debris. All such debris must be cleaned so that risks from FOD and small, abrasive, conductive particles are minimized. The operator will thus clean away the area and will also deburr the edges left from the router operations 175.

Fillers and shims replace the skin lap material, all typically 2024-T3 aluminum. A first step is to prepare and then install fillers and shims 180 that take up the space in the skin, as illustrated above in FIGS. 3–5. Then a doubler and preferably a tripler are laid 185 over the skin. Fasteners 190 then secure all fillers, shims, the doubler and the tripler. In one embodiment of the invention, the doubler overlaps the skin portions by four rows of fasteners, and the tripler overlaps the skin portions by three rows of fasteners. The doubler may be the width of 11 rows of fasteners (about 13 inches wide) and the triplet about 9 rows of fasteners (about 11 inches wide). The width of the doubler or tripler includes the width of the original skin lap, about 3–4 inches, typically 3½ inches. Thus, the new skin lap in one embodiment is about 13 inches wide, and reinforced for the middle 11 inches, as compared to the original 3½ inch overlap. The new construction may be more robust than the original, and may better resist cracks, provided that the skin lap replacement process does not provide crack initiation sites or stress concentrators. The skin lap router apparatus and method provide a much more controllable process for this improvement.

While this invention has been shown and described in connection with the preferred embodiments, it is apparent that certain changes and modifications, in addition to those mentioned above, may be made from the basic features of this invention. For example, while aluminum is typically used for aircraft skin, the same techniques may be used on aircraft with titanium skins or skins of other metals or alloys without departing from the invention. Cutting tools used should be compatible with the skin to be removed. If composite skins (typically graphite/epoxy or glass/graphite/epoxy or other combinations) are used, this technique may be even more useful in removing skins that are bonded rather than riveted together. The invention is not limited to aircraft, and may be used in the same manner to remove sheet metal from other structures, including but not limited to, buildings, silos, automobiles, trains, locomotives and the like.

Because of the importance of not causing damage to aircraft, it is prudent to use embodiments that carefully control the movement of the router or cutting tool. While it is not strictly necessary to the practice of the invention to include vacuum suctioning of the debris, no prudent aircraft operator will allow metal-cutting on their aircraft without very great consideration for the generation of foreign objects and the possibility of foreign object damage. There are many other ways to practice the invention besides the examples and embodiments presented here. Other cutting tools besides end mills may be used, for instance, face mills or even router bits, without departing from the spirit of the invention. While pneumatic routers have been emphasized, electric routers will also suffice to practice the invention. Routers were used because they are small, portable, and commercially available. They may also be moved onto aircraft gantries and service platforms with ease. A portable milling machine, especially one using an end mill, could work as well, but perhaps not so conveniently as the embodiments mentioned. Accordingly, it is the intention of the applicants to protect all variations and modifications within the valid scope of the present invention. It is intended that the invention be defined by the following claims, including all equivalents.

What is claimed is:

1. A skin lap replacement method for an aircraft skin, comprising:

providing a skin lap router apparatus having a guide, a platform, a router having a vertical adjustment and a vacuum fitting;

mounting the router apparatus to the aircraft by fasteners drilled through the aircraft skin;

removing a first skin portion and a second skin portion using said skin lap router to cut the skin portions;

replacing said first and said second skin portions;

installing a doubler and a tripler skin portions; and inspecting at least one of said first, second, doubler and tripler skin portions.

2. The method of claim 1, further comprising vacuuming particles and debris generated during removing said skin portions.

3. The method of claim 1, further comprising removing fasteners holding the skin.

4. The method of claim 1, further comprising installing fillers prior to installing said doubler and tripler portions.

5. The method of claim 1, further comprising controlling the speed of the router.

6. The method of claim 1, wherein the inspecting is accomplished by visual and eddy current inspection.

7. The method of claim 1, wherein the removal is accomplished by a high-speed carbide end-mill used in the router.

8. The method of claim 1, further comprising deburring and cleaning cut surfaces.

9. The method of claim 1, further comprising relieving the skin of the aircraft weight.

10. The method of claim 1, further comprising inspecting the skin before removing skin portions.

11. The method of claim 10, further comprising removing objects blocking the view of an inspector.

\* \* \* \* \*